United States Patent [19]
Takeda et al.

[11] Patent Number: 5,144,609
[45] Date of Patent: Sep. 1, 1992

[54] APPARATUS FOR TRACKING AN OPTICAL DISC

[75] Inventors: Katsumi Takeda, Yokohama; Tadashi Saitoh; Takashi Takeuchi, both of Fujisawa; Junichi Iida, Yokohama, all of Japan

[73] Assignee: Hitachi, Ltd., Tokyo, Japan

[21] Appl. No.: 275,992

[22] Filed: Nov. 22, 1988

[30] Foreign Application Priority Data

Dec. 2, 1987 [JP] Japan .................. 62-303413

[51] Int. Cl.$^5$ .............................................. G11B 7/00
[52] U.S. Cl. .............................. 369/44.41; 369/44.34; 369/44.13; 369/44.25
[58] Field of Search ............... 369/44.11, 44.12, 44.13, 369/44.25, 44.26, 44.34, 44.41

[56] References Cited

U.S. PATENT DOCUMENTS

| | | | |
|---|---|---|---|
| 4,243,850 | 1/1981 | Edwards | 369/609 |
| 4,402,061 | 8/1983 | Hazel et al. | 369/275.5 |
| 4,432,083 | 2/1984 | Hsieh et al. | 369/32 |
| 4,435,797 | 3/1984 | Hsieh et al. | 369/32 |
| 4,443,870 | 4/1984 | Hazel et al. | 369/44.26 |
| 4,489,406 | 12/1984 | Hsieh et al. | 369/44.26 |
| 4,553,228 | 4/1985 | Gerard et al. | 369/44.26 |
| 4,561,082 | 12/1985 | Gerard et al. | 369/44.26 |
| 4,562,564 | 12/1985 | Bricot et al. | 369/44.26 |
| 4,577,301 | 3/1986 | Mathews et al. | 369/44.26 |
| 4,660,191 | 4/1987 | Maeda et al. | 369/44.35 |
| 4,702,555 | 10/1987 | Iguma et al. | 369/44.15 |
| 4,775,967 | 10/1988 | Suimada et al. | 369/44.26 |
| 4,803,677 | 2/1989 | Yamaguchi et al. | 369/44.26 |
| 4,807,214 | 2/1989 | Getreuer | 369/44.35 |
| 4,843,601 | 6/1989 | Eguchi et al. | 369/44.26 |
| 4,951,275 | 8/1980 | Saitoh et al. | 369/44.41 |

Primary Examiner—Stuart S. Levy
Assistant Examiner—Tan Nguyen
Attorney, Agent, or Firm—Antonelli, Terry, Stout & Kraus

[57] ABSTRACT

In an apparatus for tracking an optical disc, speed in acquiring a steady tracking condition is significant. That is, if the light beam is subjected to feedback while it is positioned in a positive feedback region, e.g., in the middle of adjoining tracks, the track servo system causes an oscillation. Therefore, according to the present invention, there is effected a comparison between the magnitude of signals from two pits disposed offset from the track and a pit on the track to determine the position of the light beam so that the tracking error signal may be inversed when the light beam is positioned in the middle of adjoining tracks. This will operate the tracking system in the negative feedback region to more quickly achieve a stable tracking state.

18 Claims, 9 Drawing Sheets

APPARATUS FOR TRACKING AN OPTICAL DISC

BACKGROUND OF THE INVENTION

The present invention relates to an apparatus for tracking an optical disc by means of sampling marks regularly distributed around the track and, more particularly, to an apparatus for tracking an optical disc capable of pulling into a tracking control operation steadily and quickly.

Figure 1:
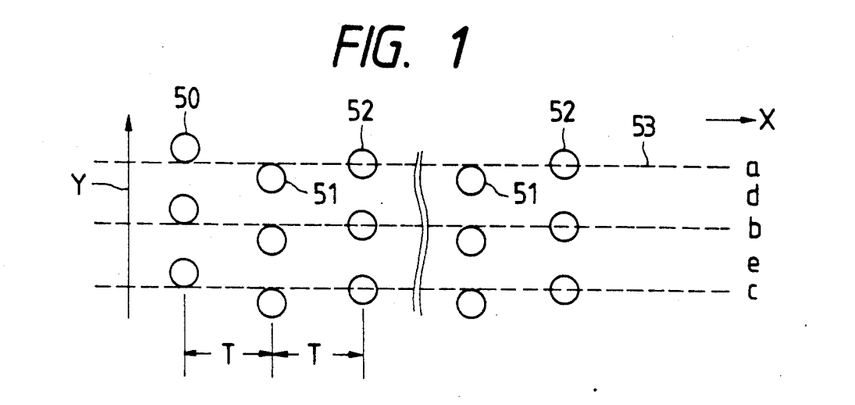
FIG. 1 is an explanatory diagram of sample marks formed on the track.

In one known method for tracking an optical disc, reproduced signals are obtained from pits previously formed distributed around the track at regular intervals and a tracking signal is obtained based on the reproduced signals from the pits. That is, as described in U.S. Pat. No. 4,562,564, pairs of pits are previously formed along an imaginary center line of the track in a wobbled manner, and the tracking error signal is obtained based on the fact that the signal amplitude values obtained from the wobbled pits change according to relative distance between the light beam and the wobbled pits. A similar tracking method is also discussed in a paper published in SPIE, Proceeding, Vol. 695, Optical Data Storage II (1986), pp. 112-115. This method uses sampling marks consisting of three pits, as shown in FIG. 1. Referring to the figure, reference numerals 50 and 51 indicate a pair of pits for detecting a tracking error signal, which are offset from the imaginary center 53 of the track to opposite sides by a distance of ¼ of a track pitch. Reference numeral 52 indicates a pit located on the imaginary center of the track for reproducing a clock signal. FIG. 1 shows three tracks a, b, c, on which pits 50, 51, 52 are distributed respectively. On each track, a distance between pits 50 and 51, and a distance between pits 51 and 52 are a constant as (T). The pits 50, 51 and 52 are arranged on the track repeatedly with a same order.

Figure 2:
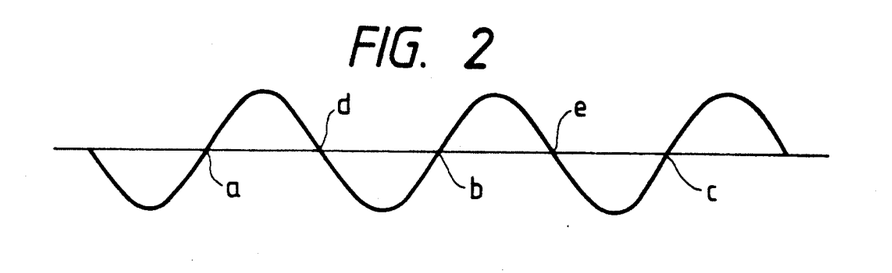
FIG. 2 is an explanatory diagram of a tracking error signal.

The tracking error signal which is generated when the track moves in a direction of an X-axis with a high speed in accordance with a rotation of the disc, and when a light beam moves across the tracks on the optical disc in a direction of a Y-axis perpendicular to the track is made up of the difference between amplitude values of the reproduced signals from the pits 50 and 51. That is, such a sinusoidal tracking error signal as shown in FIG. 2, wherein points a, b, c represent that an optical pick-up is located on the center of the track and the points d, e represent that an optical pick-up is located in the midpoints between tracks. At the points a, b, c, the amplitude values of the signals from the pits 50 and 51 are equal to each other, whereby the tracking error signal becomes zero.

At the points d, e, the amplitude values of the signals from the pits 50 and 51 of neighboring tracks become equal to each other, and therefore, an apparently similar tracking error signal to that generated in the center of a track is obtained. But, the polarity of the signal is opposite to that. Hence, it results in a positive feedback for the servo system, and therefore, when the tracking servo system is closed while the light spot is located between tracks, it may occur that the servo system oscillates and becomes unable to achieve alignment of the light spot of the track. Thus, a long time may be required for acquiring a steady tracking condition at the time of access.

In the above described prior art, particular consideration has not been given to the problem of such a positive feedback in the tracking servo system. As a result, there was a drawback that a long time was required before acquiring the steady tracking condition.

List of relative prior art patents and a prior application:
4,562,564, 4,561,082, 4,553,228, 4,432,083, 4,489,406, 4,435,797, 4,402,061, and 4,443,870, U.S. patent application filed on Apr. 21, 1988 corresponding to Japanese Patent Application No. 99707/87

SUMMARY OF THE INVENTION

An object of the present invention is to provide an apparatus capable of detecting the positive feedback region for its tracking servo system and to change it to a negative feedback region and thereby to achieve a steady functioning in the servo mechanism.

The aforesaid object is achieved by comparing the amplitude of a reproduced signal from a pit located in the center of the track and the average of the amplitude values of reproduced signals from two pits offset from the track and thereby detecting whether the light beam is positioned on the track or between two tracks and inversing the polarity of the tracking error signal when the light beam is located between two tracks.

Figure 3:
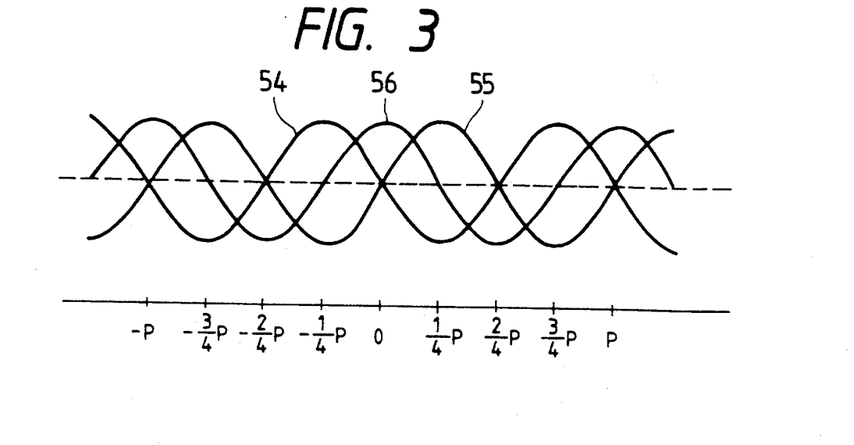
FIG. 3 is an explanatory diagram of amplitude values of reproduced signals.

As the light beam moves across the tracks, the envelopes of the reproduced signals from the pits 50, 51, 52 respectively vary sinusoidally as indicated by reference numerals 54, 55, 56 in FIG. 3. Here, the abscissa represents the position in track pitches relative to the center of the track, with the center of the track expressed by O and the track pitch by P.

On the track, the amplitude 56 of the pits 52 is larger than the amplitude values 54, 55 of the other two pits, whereas in the middle of the tracks, the former conversely becomes smaller than the latter. The average of the amplitude values 54 and 55 of the pits 50 and 51, when their sizes and forms are equal, becomes virtually constant and also becomes equal to the amplitude values of the pits 52. Therefore, when comparing the amplitude of the pit 52 with the average of the amplitude values of the pits 50 and 51, it is known, if the amplitude of the pit 52 is larger than the latter, that the light beam is positioned within ¼ of the track pitch from the center of the track, whereas if the former is smaller than the latter, it is known that the light beam is positioned within ¼ of the track pitch from the middle of the neighboring tracks. Thus, through comparison of the amplitude values of the reproduced signals from the three pits, it becomes possible to detect the positive feedback region for the tracking servo system and inverse the polarity of the tracking error signal for changing the positive feedback region like as a negative feedback region. Thus, a steady and speedy tracking condition can be achieved by the present invention.

DESCRIPTION OF THE PREFERRED EMBODIMENTS

A first embodiment of the present invention will be described below. The overall system of the optical disc apparatus consists of an optical disc, a laser optical system, and signal processing electronics as shown in FIG. 1 of U.S. Pat. No. 4,562,564 or FIG. 1 or FIG. 3 of U.S. Pat. No. 4,432,083.

The signal processing electronics detect the tracking error signal and adjust the angle of a mirror in a laser optical system so that the light beam may follow the track. When a two-dimensional optical system as disclosed in U.S. Pat. No. 4,702,555 is used, the object lens itself is laterally shifted so that the light beam may follow the track.

Figure 4:
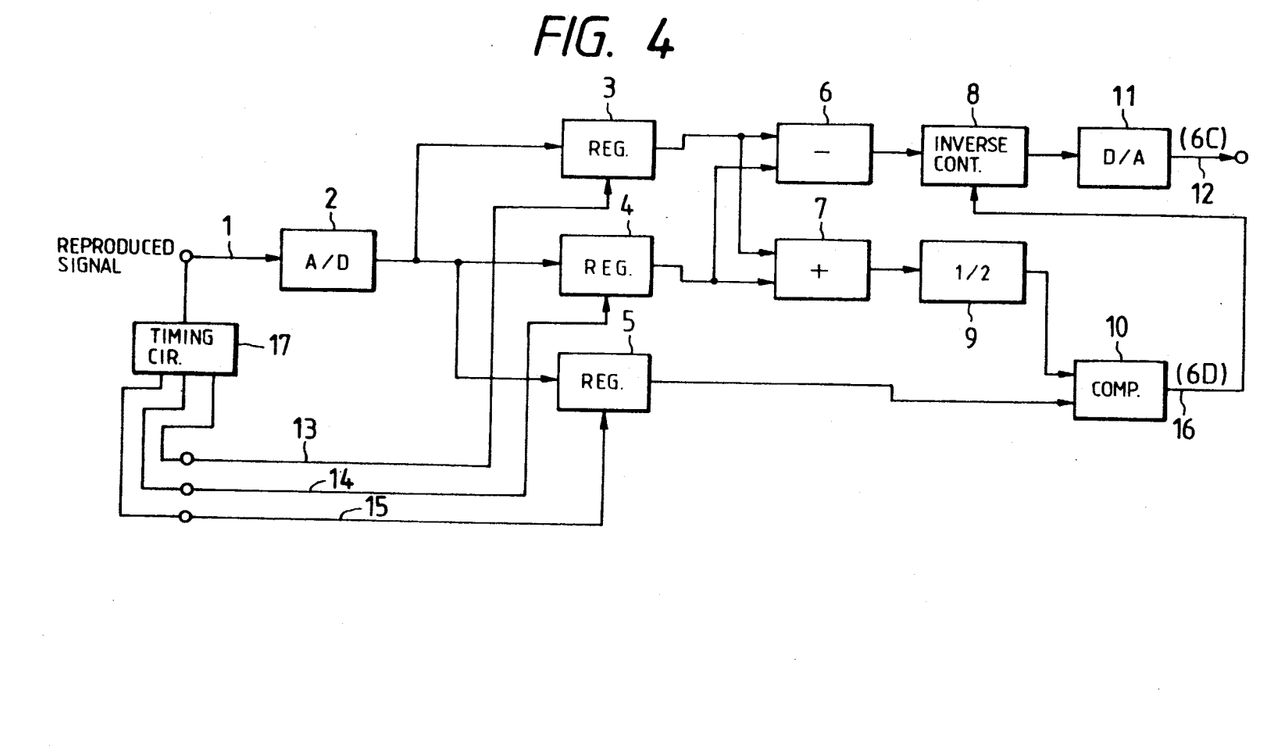
FIG. 4 is a circuit block diagram of an embodiment of the present invention.

A first embodiment of a tracking circuit in the signal processing electronics will now be described with reference to FIG. 4. In FIG. 4, a reference numeral 2 indicates an analog-to-digital converter (A/D converter), numerals 3, 4, and 5 indicate registors, numeral 6 indicates a substrater, numeral 7 indicates an adder, numeral 8 indicates an inverse control circuit, numeral 9 indicates a ½ circuit, numeral 10 indicates a comparator, and numeral 11 indicates a digital-to-analog converter (D/A converter).

Figure 5A:
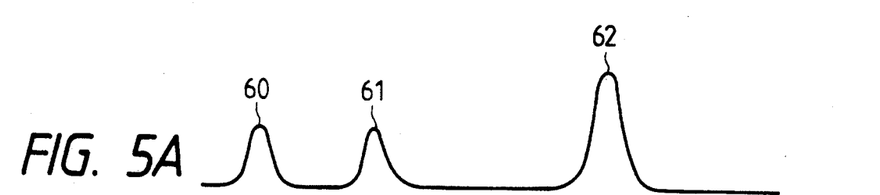
FIGS. 5A–5E, FIGS. 6A–6D and FIGS. 7A–7B are explanatory diagrams of the embodiment of FIG. 4.
Figure 5B:
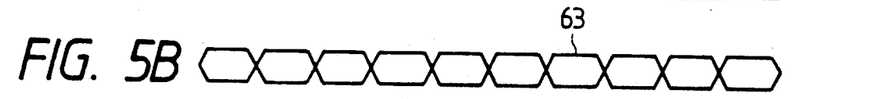
Figure 5C:
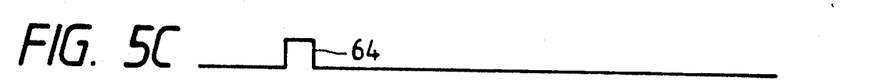
Figure 5D:
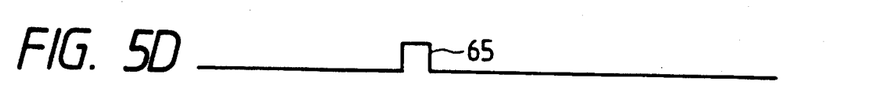
Figure 5E:
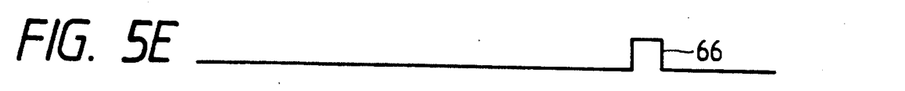

A signal reproduced from each pit is input to a terminal 1 and converted into a digital value at a predetermined clock frequency by the A/D converter 2. The timing circuit 17 decodes the reproduced signal and generates timing signals at the timing for the pits 50, 51 and 52. As this circuit, a circuit such as the sampling circuit 12 of FIG. 7 of U.S. Pat. No. 4,562,564, for example, can be used. Through a line 13, the timing signal 64 as shown in FIG. 5C is input to the register 3 so that the data of the amplitude value 60 (FIG. 5A) of the first tracking error detecting pit 50 is taken in. Likewise, data of the amplitude values 61, 62 (FIG. 5A) of the pits 51 and 52 are taken into the registers 4, 5 according to the timing signals 65, 66 (FIG. 5D, 5E) in lines 14, 15. The signal 63 shows the fundamental clock. In the substracter 6, the difference between the amplitude values of the reproduced signals from the tracking error detecting pits 50 and 51 is calculated whereby a tracking error signal is produced. The tracking error signal passes through the inverse control circuit 8 and is converted into an analog signal by the D/A converter 11. The tracking error signal output through a line 12 is supplied to a tracking servo circuit, which is not shown in drawing, and provides a control to maintain the light spot on the track.

On the other hand, by means of the adder 7 and the ½ circuit 9, the value of the sum of the amplitude values 60 and 61 divided by 2, namely, the average value, is calculated. The ½ circuit 9 is realized in practice by adapting a technique such that the output of the adder 7 is shifted therein by one bit. The comparator 10 compares the average value with the amplitude value of the pit 52 in magnitude and outputs the result to the inverse control circuit 8. The inverse control circuit 8 inverses the tracking error signal output from the substracter 6 when the comparator detects the positive feedback region, namely, when the light beam is positioned in the middle of neighboring tracks.

Figure 6A:
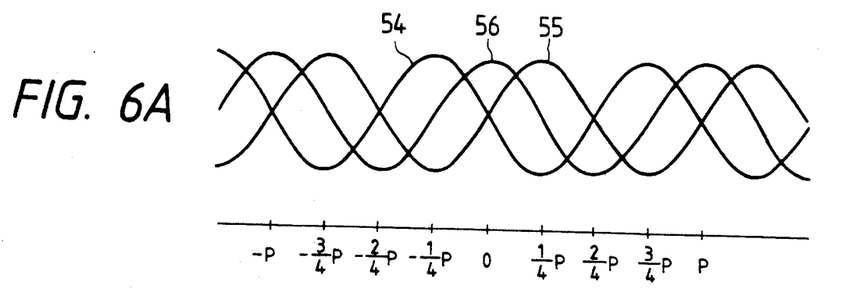
Figure 6B:
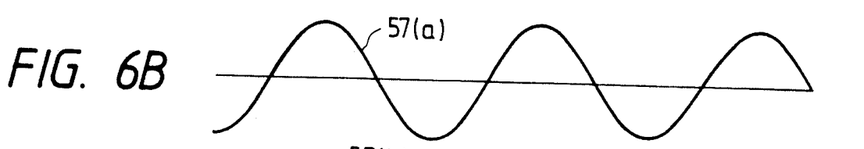
Figure 6C:
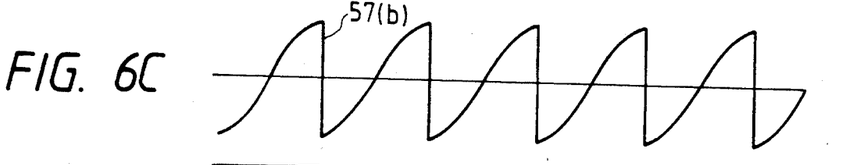
Figure 6D:
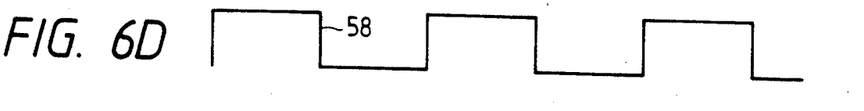

The operation of the embodiment of FIG. 4 will be described again with reference to FIGS. 6A to 6D. When the light beam moves in the direction of crossing the tracks, the envelopes of the signal amplitude values of the three pits vary as indicated by reference numerals 54, 55, and 56 (FIG. 6A). Therefore, the tracking error signal is detected essentially as shown by a reference numeral 57(a) by the substracter 6, the inverse control circuit 8, and the D/A converter 11. On the other hand, the output 16 of the comparator 10 becomes "1" in the vicinity of the center of the track and becomes "0" in the vicinity of the middle of the two tracks as indicated by a reference numeral 58 (FIG. 6D). The inverse control circuit 8 inverses the output signal of the substracter 6 when the output 16 of the comparator 10 is "0" as an off-track state. The inverse control circuit 8 passes through the output signal of the substracter 6 when the output 16 of the comparator 10 is "1" as an on-track state. By the function of the inverse control circuit 8 described above, the output signal 12 of the D/A converter 11 changes to the signals as indicated by a reference numeral 57(b) (FIG. 6C). Since the output signal of the D/A converter 11 has a waveform which detects the negative feedback region in both cases of locating the light beam on the track and in the middle of two tracks, it becomes possible to quickly acquire a steady tracking condition.

Figure 7A:
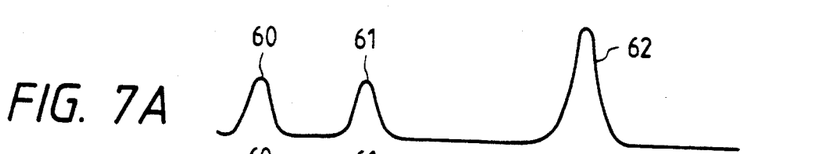
Figure 7B:
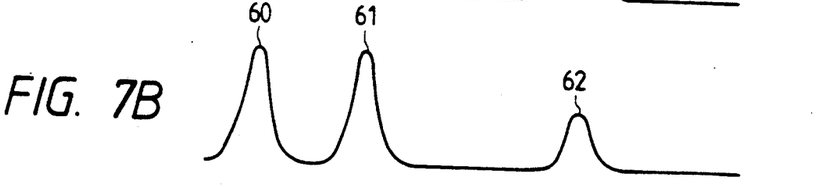
Figure 8:
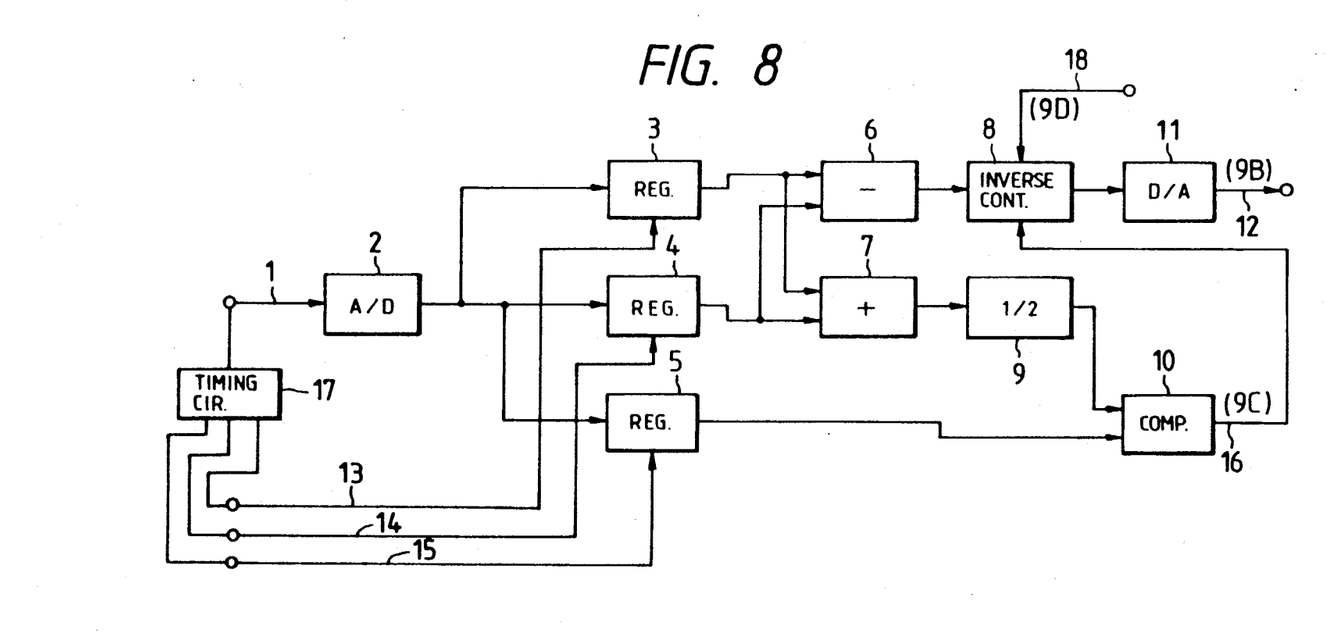
FIG. 8 is a circuit block diagram of another embodiment of the present invention.

In this embodiment, there is a possibility that the tracking servo system acquires the light beam in the middle of the two tracks. In this case, as shown in FIGS. 7A-7B, a relative magnitude between the amplitude value 60 or 61 of the pit 50 or 51 and the amplitude value 62 of the pit 52 is different in case of locating the light beam on the track (FIG. 7A) and locating the light beam in the middle of two tracks (FIG. 7B) under the condition of acquiring the tracking servo system. Since the two states can be distinguished by the outputs of the comparator 10, the light beam jumps to a next track by a track jumping system when the light beam is located in the middle of the two tracks.

Figure 9A:
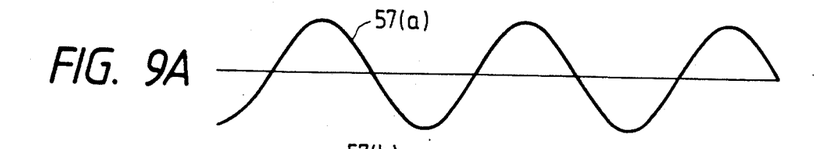
FIGS. 9A-9D are explanatory diagrams of the embodiment of FIG. 8.
Figure 9B:
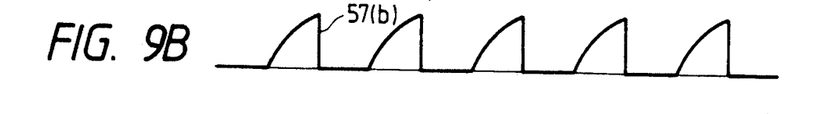
Figure 9C:
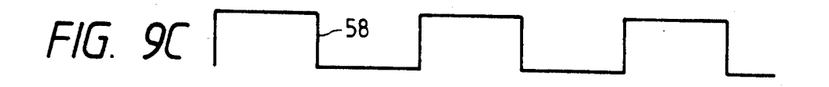
Figure 9D:
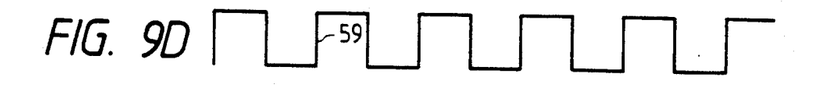
Figure 10:
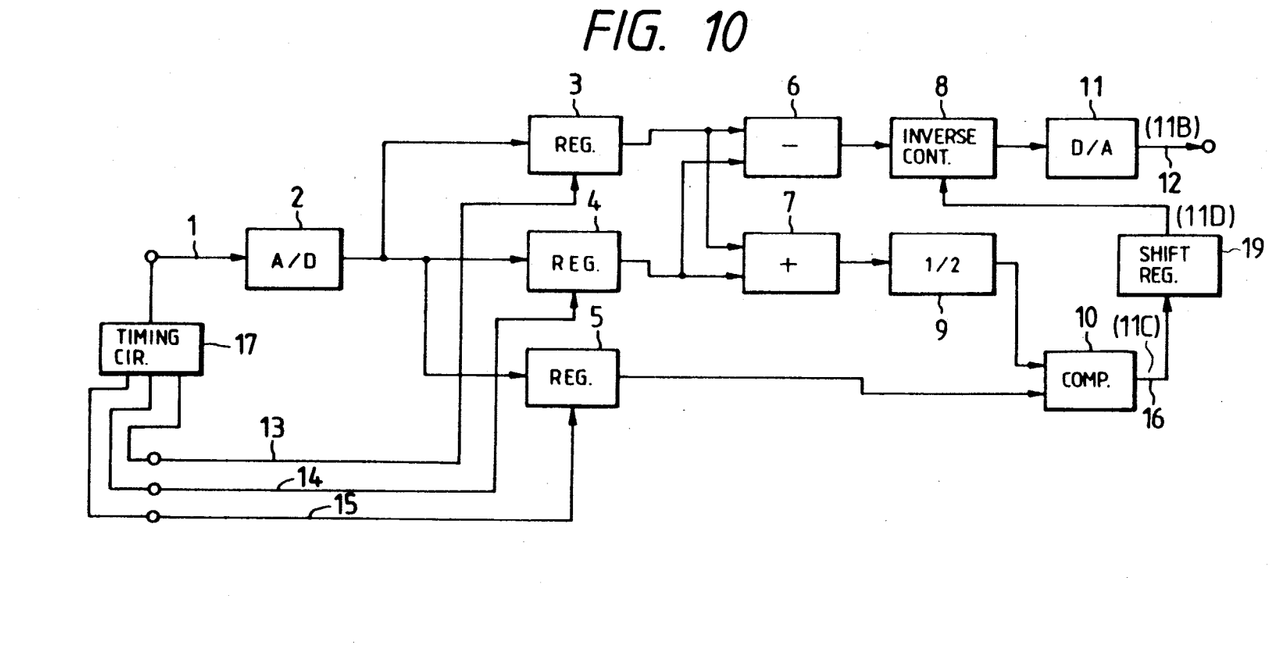
FIG. 10 is a circuit block diagram of a third embodiment of the present invention.

Another (or second) embodiment of the present invention will be described with reference to FIGS. 8 and 9A to 9D, in which the parts performing the same operations as those in FIG. 4 are indicated by corresponding reference numerals. The only difference from the first embodiment is an input of the inverse control circuit 8. An inverse control signal is input through a line 18 from a micro-processor which is not shown in the drawing. The inverse control signal can be controlled by the micro-processor as being variable or as a constant value. The tracking error signal 57(a) is obtained the same as described in the first embodiment of FIG. 4 (FIG. 9A). When the inverse control signal 18 (FIG. 9D) is input to the inverse control circuit 8, the output signal of the inverse control circuit 8 decreases to a ground level (GND) during a positive level of the inverse control signal 18. Namely, the positive level period of the inverse control signal 18 is considered to be the positive feedback region of the tracking error signal. By this inverse control, the tracking error signal indicated by a reference numeral 57(b) can be obtained (FIG. 9B).

In this second embodiment, it becomes possible to quickly acquire a steady tracking condition. Further, since the inverse control signal 18 can be varied easily, the system can cope with an error or a delay time caused by a dispersion.

Figures 11A, 11B:
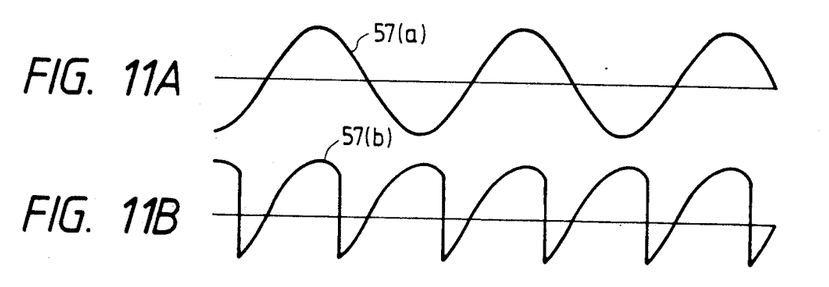
FIGS. 11A-11D are explanatory diagrams of the embodiment of FIG. 10.
Figure 11C:
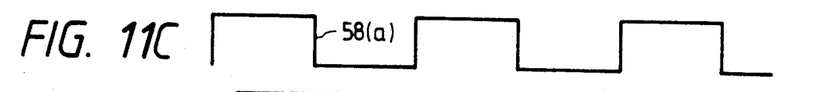
Figure 11D:
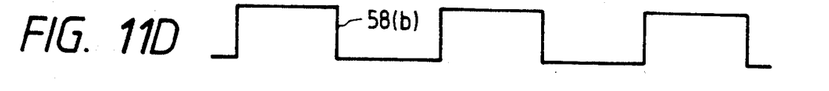
Figure 12:
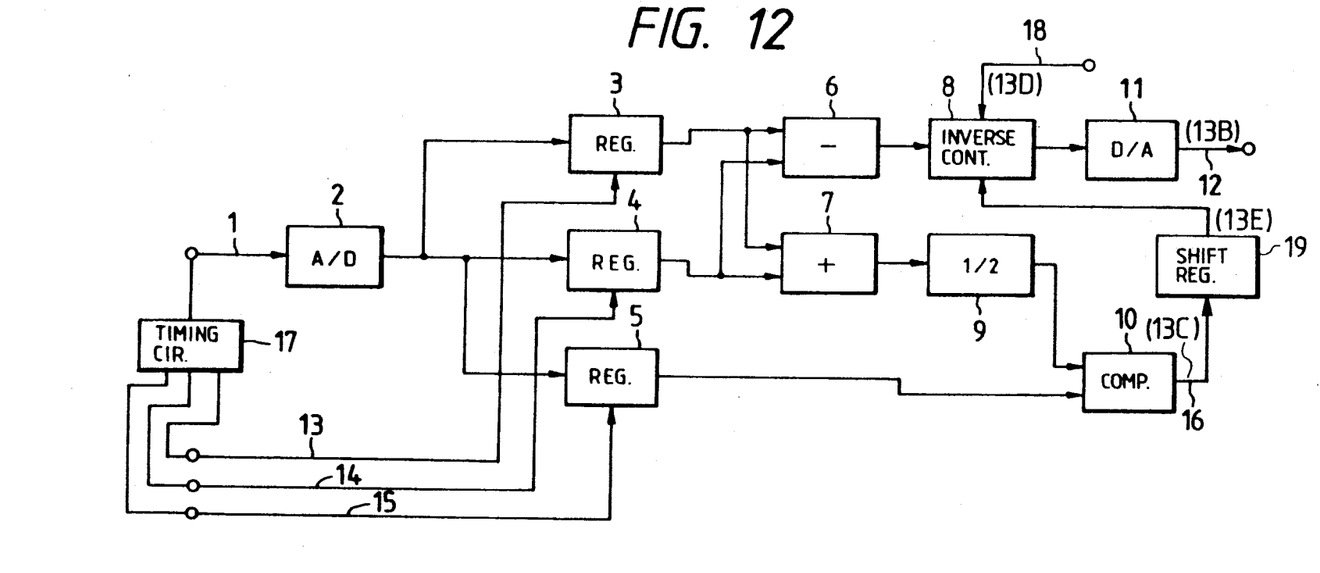
FIG. 12 is a circuit block diagram of a fourth embodiment of the present invention.
Figures 13A, 13B:
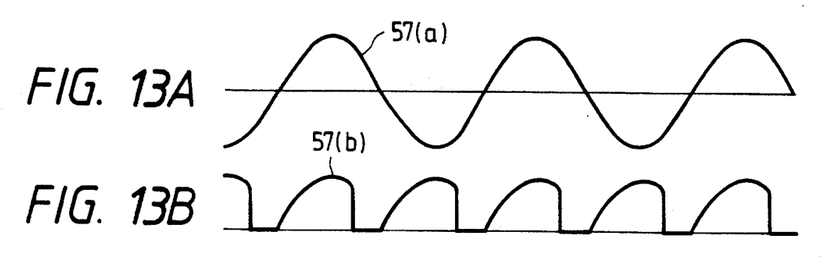
FIGS. 13A-13E and FIGS. 14A-14D are explanatory diagrams of the embodiment of FIG. 12.
Figure 13C:
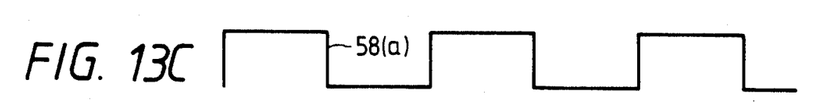
Figure 13D:
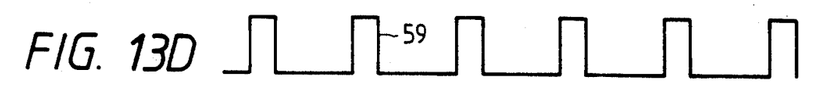
Figure 13E:
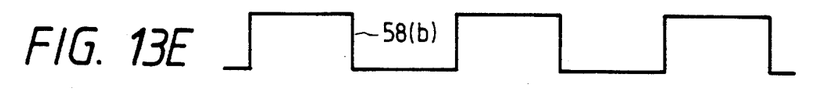
Figures 14A, 14B:
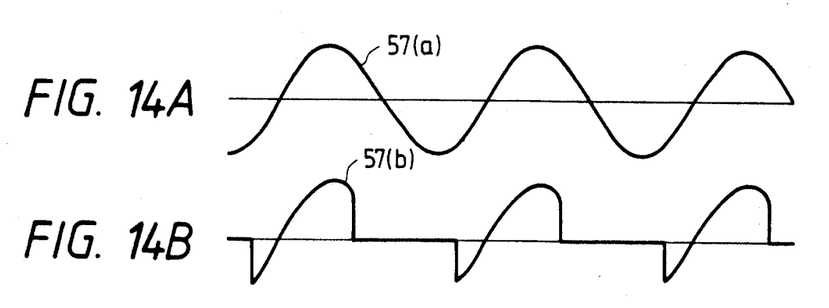
Figure 14C:
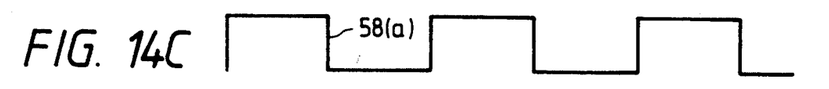
Figure 14D:
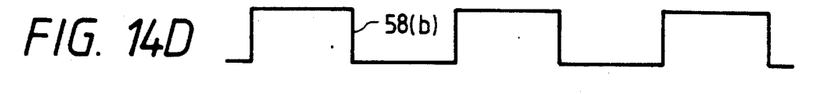

A third embodiment of the present invention will be described with reference to FIGS. 10 and 11A to 11D, in which parts performing the same operations as those in FIG. 4 are indicated by corresponding reference numerals. The only difference from the above embodiments is a shift register 19. The tracking error signal 57(a) is obtained described in the first embodiment of FIG. 4 (FIG. 11A). The signal 58(a) (FIG. 11C) output from the comparator 10 inputs to the shift register 19 and is delayed a predetermined numbers of clock 58(b) (FIG. 11D). The inverse control circuit 8 is operated by the delayed signal 58(b) and the signal 57(b) in FIG. 11B can be obtained.

In this third embodiment, it becomes possible to quickly acquire a steady tracking condition. Further, since the inverse control signal 18 can be varied easily, the system can cope with a delay time by a change-over time. Since a positive direct current component is produced at the tracking error signal indicated by the reference number 57(b), it can happen that a tracking actuator is offset by the direct current component. The tracking actuator can be oppressed with a signal integrated in the tracking error signal.

Still other embodiment of the present invention will be described with reference to FIGS. 12 and 13A–13E, in which the parts performing the same operations as those in FIG. 4 are indicated by corresponding reference numerals. This fourth embodiment is a combination of the embodiment described in FIG. 8 and the embodiment described in FIG. 10. FIGS. 13A–13E show waveforms of essential points of FIG. 12. A basic operation of the inverse control signal 18 and the shift register 19 etc. is the same as those in the second and the third embodiment.

FIGS. 14A–14D show waveforms of the fifth embodiment of the present invention. The invention can be realized, in the fourth embodiment shown in FIG. 12, by decreasing the output of the inverse control circuit 8 to a ground level (GND) when the signal indicated by a reference numeral 58(b) (FIG. 14D) is a zero level.

In the foregoing embodiments, the inverse control circuit 8 can be provided after the D/A converter 11.

The optical disc apparatus according to the present invention, as described so far, is enabled to detect the positive feedback region for changing to the negative feedback region, and it becomes possible to quickly acquire a steady tracking condition.

What is claimed is:

1. An apparatus for tracking an optical disc performing tracking according to a tracking error signal detected by use of signals reproduced from previously formed pits at regular intervals on the track, wherein
said previously formed pits are made up of at least two pits, of which one is slightly offset from the track to one side and the other is slightly offset from the track to the other side, and wherein
a pit is further formed on the track, comprising:
means for detecting a difference between signal amplitude of a signal reproduced from one of said offset pits and signal amplitude of a signal reproduced from the other of said offset pits, said difference signal being used as the tracking error signal for performing tracking control;
means for comparing a signal reproduced from said pit on the track with a predetermined signal, said predetermined signal is provided by operational means which outputs an average amplitude value of the signal reproduced from one offset pit and the signal reproduced from the other offset pit; and
means for inversing a polarity of said tracking error signal in response to an output of said comparing means when said comparing means detects a positive feedback region of a tracking servo system, said positive feedback region corresponding to a region in a middle of adjoining tracks.

2. An apparatus according to claim 1, wherein said comparing means detects said positive feedback region when said predetermined signal is larger in amplitude than said reproduced signal from said pit on the track.

3. An apparatus according to claim 2, wherein said predetermined signal is an output signal from operational means for calculating an average value of the signal amplitude of the signal reproduced from one of said offset pits and the signal amplitude of the signal reproduced from the other of said offset pits.

4. An apparatus according to claim 3, wherein said operational means includes an adder for adding the signal amplitude of the signal reproduced from one of said offset pits and the signal amplitude of the signal reproduced from the other of said offset pits, and a ½ circuit for dividing an output signal of said adder in amplitude by two.

5. An apparatus according to claim 4, wherein the offset amounts of said previously formed pits are ¼ of the track pitch.

6. An apparatus according to claim 5, further comprising:
means for shifting a phase of said output signal of said comparing means, wherein an output signal of said shifting means is supplied to said comparing means to control an inverse timing.

7. An apparatus according to claim 2, wherein the offset amounts of said previously formed pits are ¼ of the track pitch.

8. An apparatus according to claim 2, further comprising:
means for shifting a phase of said output signal of said comparing means, wherein an output signal of said shifting means is supplied to said comparing means to control an inverse timing.

9. An apparatus according to claim 8, wherein at each occurrence of said offset pits and said another pit on the track distances between consecutive offset pits and between an offset pit and an adjacent one of said another pit on the track remains constant and equal.

10. An apparatus according to claim 1, wherein said operational means includes an adder for adding the signal amplitude of the signal reproduced from one of said offset pits and the signal amplitude of the signal reproduced from the other of said offset pits, and a ½ circuit for dividing an output signal of said adder in amplitude by two.

11. An apparatus according to claim 1, wherein the offset amounts of said previously formed pits are ¼ of the track pitch.

12. An apparatus according to claim 1, further comprising:
means for shifting a phase of said output signal of said comparing means, wherein an output signal of said shifting means is supplied to said comparing means to control an inverse timing.

13. An apparatus according to claim 1, wherein at each occurrence of said offset pits and said another pit on the track distances between consecutive offset pits and between an offset pit and an adjacent one of said another pit on the track remains constant and equal.

14. An apparatus for tracking an optical disc performing tracking according to a tracking error signal detected by use of signals reproduced from previously formed pits on the track, wherein said previously formed pits are made up of at least two pits formed at regular intervals on the track, of which one is slightly offset from the track to one side and the other is slightly offset from the track to the other side and another pit which is formed at regular intervals on the track, comprising:

means for detecting a difference between signal amplitude of a signal reproduced from one of said offset pits and signal amplitude of a signal reproduced from the other of said offset pits, the difference signal being used as the tracking error signal for performing tracking control;

means for comparing a signal reproduced from said another pit on the track with a predetermined signal corresponding to average amplitude of the signals reproduced from said one of said offset pits and said other of said offset pits; and means for inverting a polarity of said tracking error signal in response to an output of said comparing means when said comparing means detects a positive feedback region of a tracking servo system said positive feedback region corresponding to a region in a midle of adjoining tracks.

15. An apparatus according to claim 14, wherein said comparing means detects said positive feedback region when said predetermined signal is larger in amplitude than said reproduced signal from said pit on the track.

16. An apparatus according to claim 15, wherein the offset amounts of said previously formed pits are ¼ of the track pitch.

17. An apparatus according to claim 14, further comprising:

means for shifting a phase of said output signal of said comparing means, wherein an output signal of said shifting means is supplied to said comparing means to control an inverse timing.

18. An apparatus according to claim 14, wherein at each occurrence of said offset pits and said another pit on the track distances between consecutive offset pits and between an offset pit and an adjacent one of said another pit on the track remains constant and equal.

* * * * *